United States Patent [19]

Minato et al.

[11] Patent Number: 5,037,024

[45] Date of Patent: Aug. 6, 1991

[54] METHOD OF SPLICING METAL WEBS

[75] Inventors: Shinichiro Minato, Minami-Ashigara; Akio Uesugi; Tsutomu Kakei, both of Shizuoka, all of Japan

[73] Assignee: Fuji Photo Film Co., Ltd., Kanagawa, Japan

[21] Appl. No.: 445,150

[22] Filed: Dec. 5, 1989

Related U.S. Application Data

[63] Continuation of Ser. No. 7,221,492, Jul. 19, 1988, abandoned.

[30] Foreign Application Priority Data

Jul. 20, 1987 [JP] Japan .................................. 62-181894
Oct. 12, 1987 [JP] Japan .................................. 62-257990

[51] Int. Cl.⁵ ..................... B23K 101/16; B65H 19/18
[52] U.S. Cl. .................................... 228/125; 228/158; 228/160; 228/5.7; 72/220; 72/203
[58] Field of Search ............. 228/125, 158, 160, 5.7, 228/199, 235; 72/220, 476, 203; 219/10.53, 78.15; 29/445, 33 B, 33 S

[56] References Cited

U.S. PATENT DOCUMENTS

| | | | |
|---|---|---|---|
| 3,421,676 | 1/1969 | Jenkins ................................ | 228/5.7 |
| 3,654,035 | 4/1972 | Takimoto . | |
| 3,915,368 | 10/1975 | Ulmer ................................. | 228/5.7 |
| 4,286,744 | 9/1981 | Gullotti et al. ..................... | 228/5.7 |
| 4,711,114 | 12/1987 | Rohde et al. ....................... | 72/203 |
| 4,878,986 | 11/1989 | Nishikawa . | |

FOREIGN PATENT DOCUMENTS

| | | | |
|---|---|---|---|
| 2205299 | 8/1973 | Fed. Rep. of Germany ...... | 228/158 |
| 51946 | 4/1979 | Japan ................................... | 72/203 |
| 32502 | 2/1983 | Japan ................................... | 72/203 |
| 110101 | 6/1983 | Japan ................................... | 72/203 |
| 59-24526 | 2/1984 | Japan . | |
| 68102 | 4/1985 | Japan ................................... | 72/203 |
| 176605 | 8/1987 | Japan ................................... | 72/203 |
| 512023 | 4/1976 | U.S.S.R. ............................. | 72/203 |
| 1052357 | 11/1983 | U.S.S.R. ............................. | 228/158 |

*Primary Examiner*—Sam Heinrich
*Attorney, Agent, or Firm*—Sughrue, Mion, Zinn, Macpeak & Seas

[57] ABSTRACT

A method of splicing together metal webs for use in planography with the ends thereof being butted or lapped against each other. In the metal web splicing method, the ends of the metal webs are spliced together in a butted manner, the splice portion thereof is welded, and the welded splice portion is rolled. According to the splicing method, there is left no level difference in the welded splice portion, which eliminates the possibility of the spliced metal webs being broken during the movement thereof and also has no ill effect on the coating process for the spliced metal webs.

5 Claims, 4 Drawing Sheets

FIG. 8 (a) PRIOR ART
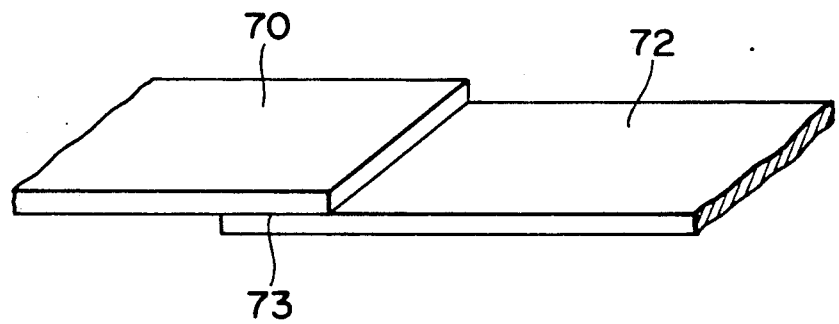
FIG. 8 (b) PRIOR ART
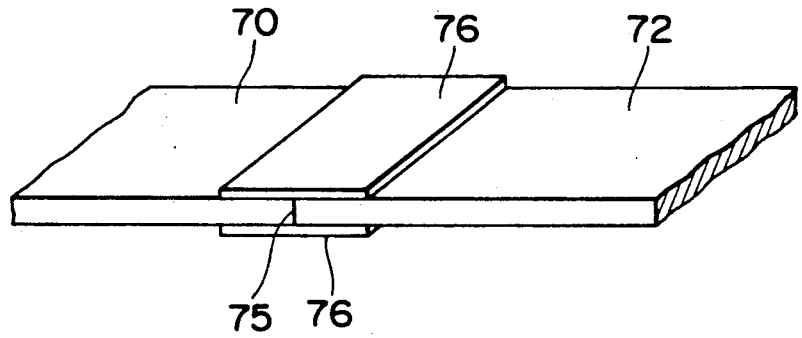

METHOD OF SPLICING METAL WEBS

This is a continuation of application Ser. No. 07/221,492, filed July 19, 1988 now abandoned.

BACKGROUND OF THE INVENTION

1. Field of the Invention

The present invention relates to a method of splicing metal webs and, in particular, to a method of splicing together the ends of flexible, thin, metal webs.

2. Description of the Related Art

A method of splicing metal webs includes a lap splicing method in which the ends of metal webs are lapped on each other and are spliced together, and a butt splicing method in which the ends of metal webs are butted against each other and are spliced together.

As shown in FIG. 8(a), in a conventional lap splicing method, the end of a metal web 70 is lapped on the end of a metal web 72 and a splice surface 73 thereof is spliced by a two-side adhesive tape or by supersonic waves (FIGS. 4 and 6 of Japanese Patent Publication (Kokai) No. 59-24526).

Also, in FIG. 8(b), there is shown a perspective view of a conventional butt splicing method of splicing metal webs. As shown in FIG. 8(b), the ends of the metal webs 70, 72 are butted against each other and the upper and lower surfaces of the butted splice portion 75 are then spliced by one-side adhesive tapes 76, 76, respectively. (FIG. 2 of Japanese Patent Publication (Kokai) No. 59-24526).

However, in the conventional metal webs splicing method as shown in FIG. 8(a), there is left a difference in level in the splice portion of the webs, which makes it impossible for the spliced metal webs to be brought into smooth contact with a pass roller and the like when they are moved. Also, the thickness of the splice portion is greater than those of the metal webs and, if in the lapped splice surface 73 there is left any unspliced portion, then the lapped splice surface 73 may come off while the metal webs are moved. Further, there is a problem that the lapped splice surface 73 may be in contact with other materials during the movement of the metal webs in a step of treating the metal webs. Moreover, when the treatment step includes a process for treating the surface of the metal webs using a treatment solution, then the treatment solution may come into the clearances in the lapped splice portion 73, which may in turn result in generation of inferior quality in the following steps. In addition, there are produced various disadvantages in the surface treatment step of the metal webs. For example, in a step of coating a light-sensitive layer in manufacturing a plate for use in planography when the metal webs splice portion with a level difference passes, the coating device must be retreated to prevent damage due to its contact with the splice portion, and in case of not retreating due to the level difference, the lapped splice surface 73 has an ill effect on the coated surface thereby causing inferior quality.

Also, as shown in FIG. 8(b), in the conventional butt splicing method, the metal webs are spliced by means of the one-side adhesive tapes 76, 76 and, therefore, in the splice portion 75 thereof there is inevitably produced a level difference corresponding to the thickness of the adhesive tapes 76, 76. This level difference also causes disadvantages similar those in the above-mentioned lap splicing method. Especially, in the butt splicing method, while the spliced metal webs are being moved by the pass rollers or the like during its treating or coating step, the adhesive tapes 76, 76 in the butted portion thereof are shaved by the edges of the butted portions of the metal webs, with the result that the butted splice portion becomes weaker in strength and is easy to be cut off. Further, the metal webs 70, 72 are given bending stresses when they pass over the pass rollers, the bending stresses make it easier for the splice portion 75 to be broken. Such breakage occurs very often especially when a thin metal web having a thickness of 0.1 mm to 0.2 mm is used, or when there is a great difference between the thicknesses of the two metal webs to be spliced together.

SUMMARY OF THE INVENTION

The present invention aims at eliminating the drawbacks found in the above-mentioned prior art splicing methods.

Accordingly, it is an object of the invention to provide a metal web splicing method which can prevent the splice portion of metal webs from being broken while they are being moved and during the coating process thereof and also can eliminate the possibility of the coating process being adversely affected.

In order to attain the above object, according to one aspect of the invention, the metal webs are butted against each other and welded together, and then the welded splice portion thereof is rolled.

According to the metal web splicing method of the present invention, since the metal webs are butt welded to each other and the welded splice portion thereof is then rolled to thereby prevent the presence of any level difference in the welded splice portion, there is eliminated the possibility that the splice portions of the spliced metal webs may be broken while they are being moved, and the splice portions have no ill effect on the coating process.

Also, it is another object of the invention to provide a metal web splicing method which, even when the metal webs to be spliced are different in thickness from each other, is capable of surely avoiding a level difference in the welded splice portions of the spliced metal webs by rolling the splice portions and also which can increase the strength of the splice portions.

In achieving the above object, according to another aspect of the invention, the ends of the metal webs are welded to each other and the splice portions are rolled from behind the portions thereof to which the bead weld is attached.

According to the metal web splicing method of the present invention, since the splice portions of the spliced metal webs are rolled from behind the bead weld attached portions thereof, even when the metal webs are different in thickness from each other, the whole bead weld can be surely rolled from the back side thereof. Therefore, the strength of the welded portions can be surely increased by the rolling treatment.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures there and wherein.

DETAILED DESCRIPTION OF THE INVENTION

Detailed description will hereunder be given of the preferred embodiments of a method for splicing metal webs according to the present invention with reference to the accompanying drawings.

Figure 1:
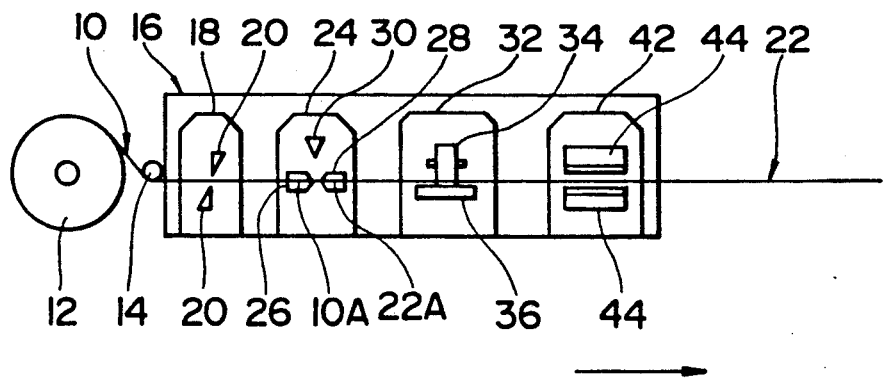
FIG. 1 is an explanatory view to illustrate a method of splicing metal webs according to the invention.

Referring first to FIG. 1, there is shown an explanatory view to illustrate a method of splicing together metal webs according to the present invention. As shown in FIG. 1, a metal web 10 is rewound from a roll 12 and passed through a pass roller 14 in sliding contact therewith, and is then moved to a splicing apparatus 16. The splicing apparatus 16 comprises a pre-cutting device 18, a welding device 24, a rolling device 32 and an edge trimming device 42. The pre-cutting device 18 is provided with cutters 20, 20. The following end 10A of the metal web 10 is cut in the width direction thereof by the pre-cutting device 18, that is, the shape of the end 10A is adjusted in such a manner that it can be properly butted against the leading end 22A of a metal web 22 to be spliced. However, when the following end 10A of the metal web 10 to be rewound can be directly and properly butted against the leading end 22A of the metal web 22, the pre-cutting device 18 is not used.

The welding device 24 is arranged downstream of the pre-cutting device 18 and it is composed of clamps 26, 28 and a welding torch 30. With the following end 10A of the metal web 10 being held by the clamp 26 and the following end 22A of the metal web 22 by the clamp 28, the metal web 10 is butted against the metal web 22. In this case, a TIG arc welding method is employed. Alternatively, a MIG arc welding, gas welding, or laser welding such as $CO_2$ laser welding, YAG laser welding and the like can also be used. While moving from above the welded portions in the width direction of the metal webs 10, 22, the welding torch 30 melts the metal webs ends 10A, 22A for welding. Also, when the metal webs 10, 22 have a thickness of 0.3 mm or less, due to the fact that the metal webs 10, 22 can be melted easily, the ends 10A, 22A of the metal webs 10, 22 are lapped slightly on each other before they are welded together.

Figure 2:
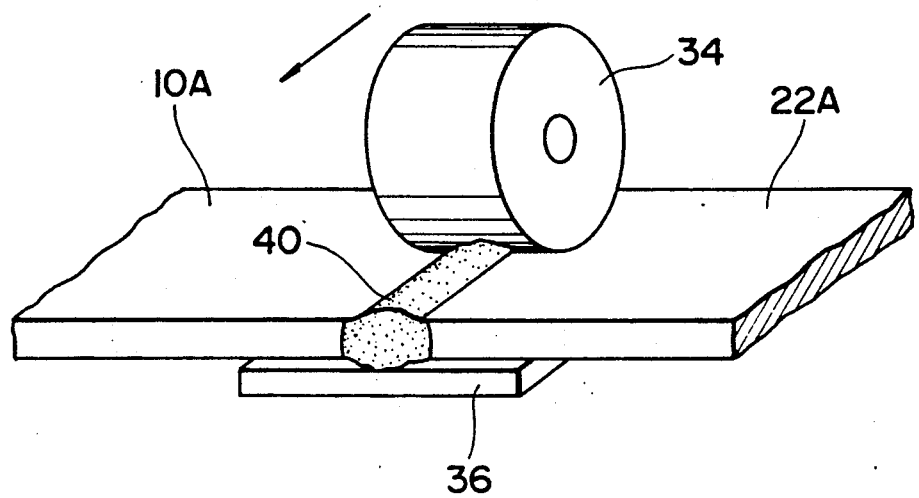
FIG. 2 is an explanatory view to illustrate a rolling method employed in a first embodiment of the invention.

Downstream of the welding device 24 there is arranged the rolling device 32 which is composed of a rolling roller 34 and a back bar 36. As shown in FIG. 2, by means of operation of the rolling roller 34 the welded portion 40 between the two metal webs 20 and 22 can be rolled.

Figure 4:
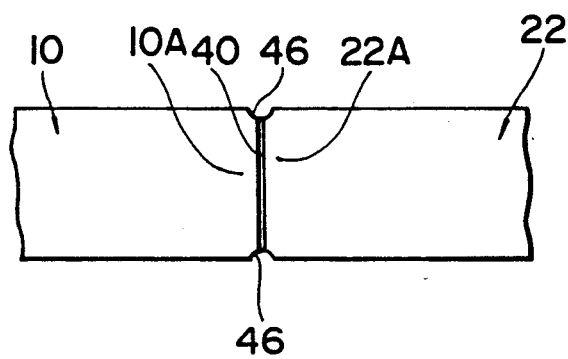
FIG. 4 is a plan view of the welded portions the edges of which are trimmed according to the metal web splicing method of the invention.

Also, downstream of the rolling device 32 there is arranged an edge trimming device 42 which includes a pair of die sets 44, 44. The welded portion 40 of the metal webs 10, 22 is moved between the two die sets 44, 44 and, as shown in FIG. 4, the two ends 46, 46 of the welded portion 40 of the metal webs 10, 22 are trimmed by the edge trimming device 42. To trim the two ends 46, 46, the die sets 44, 44 are positioned in the width direction of the welded portion 40 and then the ends 10A, 22A of the respective metal webs 10, 22 and the ends 46, 46 of the welded portion 40, as a whole, are punched. Alternatively, the edge trimming can be performed by cutting by means of laser, air plasma or the like besides the above-mentioned punching method. After completion of such trimming, the metal webs are discharged out to the coating process and the like.

Figure 3:
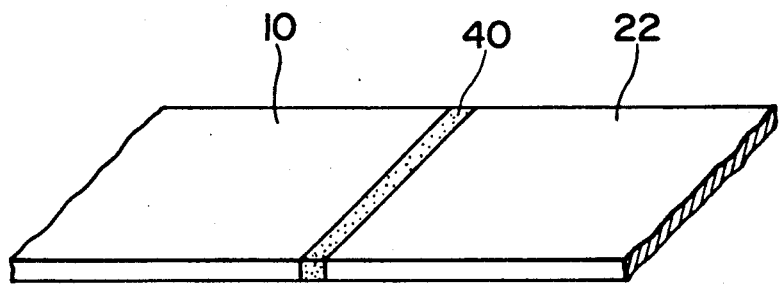
FIG. 3 is a perspective view of the portions of the metal webs that are welded and rolled in accordance with the metal web splicing method according to the invention.

In accordance with the above-mentioned metal web splicing method according to the invention, after butted against each other, the metal webs 10, 22 are welded together by the welding device 24 and the welded portion 40 thereof is rolled by the rolling device 32. This, as shown in FIG. 3, can eliminate any level difference from the welded portion 40, so that the two metal webs 10, 22 can be moved in smooth sliding contact with the pass roller and discharged out to a coating device (not shown), where they can be coated uniformly. In this case, due to the fact that the welded portion 40 has a great splicing strength and also that the welded portion 40 is moved smoothly, there is eliminated the possibility of the welded portion 40 being broken. Also, there is eliminated the need to retreat the coating device from the splice portion and, therefore, the splice portion can also be coated uniformly.

Further, due to the work hardening caused by the above-mentioned rolling treatment, the welded portion 40 can recover its tensile strength compared with the time when it is welded, thereby increasing the splicing strength thereof. Therefore, this is effective especially for aluminum and similar substances having crystals which can be made bigger due to the melting thereof when they are welded.

In addition, the surface shape of the welded portion 40 is distorted due to the concentration of heat occurring in the welding process as well as due to the varying pressures in the rolling process, so that stresses are concentrated when tension loads are applied during the movement process of the metal webs. However, as shown in FIG. 4, if the ends 46 of the welded portion 40 of the metal webs 10, 12 are trimmed, then the stress concentration can be removed, thereby eliminating the possibility that the splice portion between the metal webs 10, 22 may be broken.

Figure 5:
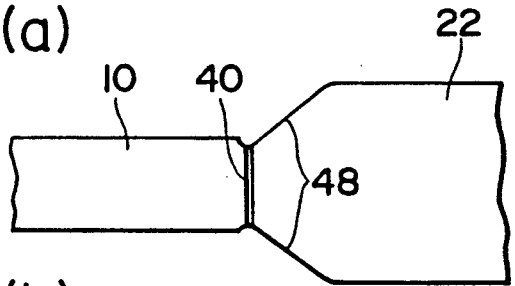
FIGS. 5(a) and (b) are respectively views of the welded portions obtained when metal different in width from each other are spliced by welding.
Figure 5:
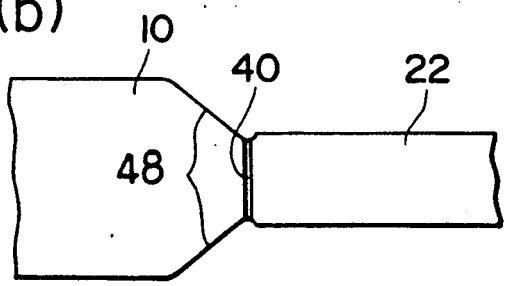

Referring now to FIG. 5(a), there is shown a plan view in which a small-width metal web is employed as the metal web 10 to be rewound from the roll 12, a large-width metal web is employed as the metal web 22 to be spliced, and these two webs are spliced together using the metal web splicing method according to the invention. Also, in FIG. 5(b), there is shown a perspective view in which, on the contrary, a large-width metal web is used as the metal web 10 to be rewound, a small-width metal web is used as the metal web 22 to be spliced is used, and these two webs are spliced by the present method. As shown in FIGS. 5(a) and (b), the edges 48 of the respective large-width metal webs are trimmed down or tapered down to the width of the small-width metal webs by the edge trimming device 42, so that the ends of the large-width metal webs are prevented from oscillating while they are being moved. Therefore, this shows that the method of splicing metal webs according to the invention can also apply to the metal webs that are different in width from each other.

Next, description will be given of tests in which the metal webs spliced by the metal web splicing method according to the invention are compared with those spliced by the conventional splicing methods.

In the test, aluminum webs each having a thickness of 0.2 mm and a width of 300 mm are used as the metal webs 10, 22. That is, the two aluminum webs are butted against each other and are then welded together by the TIG arc welding method at the speed of 1 m/min., and the welded portion 40 thereof is then rolled under the conditions of a rolling pressure of 50 kgf and a rolling speed of 0.5 m/min. The spliced metal webs treated in this manner are expressed by a sample No. 1, and the spliced metal webs treated only by the above-mentioned welding operation but not treated by the above rolling operation are expressed by a sample No. 2. Further, the spliced metal webs that are lapped on each other and spliced together using the conventional ultrasonic splicing method are expressed by a sample No. 3.

A pass roller passing test is carried out, in which while loading a tension force of 30 kg the three test samples are respectively made to pass round between 12 rubber rollers each having a diameter 100 mm and 2 mm rubber rollers each having a diameter of 200 mm, and the numbers of rounds thereof where they are cut respectively are examined. The results of the test are shown in Table 1:

TABLE 1

| Sample No. | Sample Condition | Number of Rounds Cutting (rounds) |
| --- | --- | --- |
| Sample No. 1 | Butt splicing (with rolling) | 125 |
| Sample No. 2 | Butt splicing (without rolling) | 12 |
| Sample No. 3 | Lap splicing (without rolling) | 27 |

Here, Sample No. 1 is obtained by the metal splicing method according to the invention, while Sample No. 3 is obtained by the method according to the prior art.

The table 1 shows that the number of rounds to cutting of Sample No. 1 on which both welding and rolling have been made is increased to a great degree.

Next, tests on the tension strength, level difference conditions and coating treatments are made.

That is, aluminum webs each having a thickness of 0.3 mm and a width of 300 mm are employed as the metal webs 10, 22. While being butted against each other, the two aluminum webs are welded together by the TIG arc welding method at the speed of 1 m/min., and the welded portion 40 thereof is then rolled with a rolling force of 50 kgf and at the speed of 0.5 m/min. The spliced metal webs treated in this manner are expressed by a sample No. 1, and the spliced metal webs treated only by the welding operation but not treated by the rolling operation are expressed by a sample No. 2. Further, the spliced metal webs that are lapped on each other and spliced together using the conventional ultrasonic splicing method are expressed by a sample No. 3.

TABLE 2

| Sample No. | Tensile Strength (kgf) | Level Difference (μm) | Judgement | Resultant Coating Condition |
| --- | --- | --- | --- | --- |
| Sample No. 1 | 51.3 | 20 | Good | Practically no problem arises in coating treatment |
| Sample No. 2 | 37.0 | 81 | Poor | Irregular coatings of about 10 mm width occur in the welded portion |
| Sample No. 3 | 69.0 | 300 | Very Poor | Irregular coatings of about 100 mm width occur in the welded portion |

Sample No. 1 is obtained by a metal web splicing method according to the present invention.

Sample No. 3 is obtained by a metal web splicing method according to the prior art.

As can be understood from the above results, the level difference can be reduced by the rolling treatment and the results of the coating treatment according to the invention are remarkably better than those according to the prior art.

Next, comparison tests on the edge trimming treatment were made in the following manner.

In the tests, an aluminum web having a thickness of 0.2 mm and a width of 300 mm is used as the metal web 10 and an aluminum web having a thickness of 0.2 mm and a width of 200 mm is used as the metal web 22. These two aluminum webs are lapped on each other by 0.5 mm and they are welded together using the TIG arc welding at the speed of 1 m/min. After then, the welded portion 40 thereof is rolled with the rolling pressure of 45 kgf and at the rolling speed of 0.5 m/min., and further the two ends of the welded portion 40 and the metal web 10 are edge trimmed, respectively. The spliced metal web treated in the above-mentioned manner is expressed by Sample No. 1 and the spliced metal web on which the above-mentioned rolling treatment is conducted, but the edge trimming treatment is not conducted is expressed by Sample No. 2.

TABLE 3

| Sample No. | Judgement | Resultant Coating Condition |
| --- | --- | --- |
| Sample No. 1 | Good | *Irregular coatings occur only in the welded portion but provide no practical problem. |
| Sample No. 2 | Poor | *The edges of the 300 mm-width metal web are caused to flap into contact with other substances and are consequently bent. *During the movement of the web edges the welded portion are cracked. *After spliced, irregular coating of several tens of centimeters are found in the edges. |

As shown in Table 3, Sample No. 1 is better in the coated surface treatment than Sample No. 2 on which the edge trimming treatment is not made, and no damage such as cracking or the like in the edges of Sample No. 1 during movement thereof.

This shows that the rolling treatment on the splice portion after it is welded can remove the level difference and, therefore, the spliced metal webs can be moved smoothly. Also, the edge trimming treatment can reduce the possibility of the welded portion 40 being broken or cut.

As described above, in accordance with the metal web splicing method according to the invention, since the metal webs are butted against each other and are then welded together and thereafter the welded splice portion thereof is rolled, the welded splice portion is prevented from being broken or cut during movement thereof and also has no adverse effect on the following coating treatment process.

Figure 6:
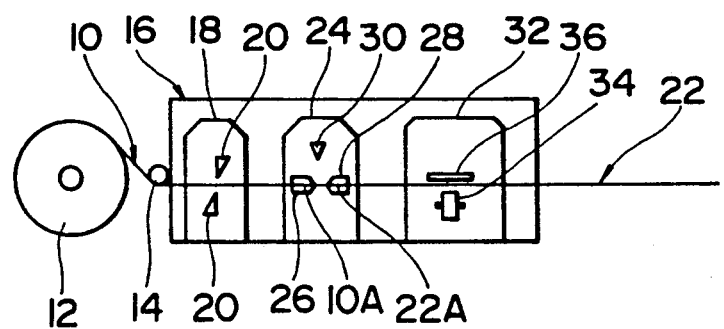
FIG. 6 is an explanatory view of illustrate a rolling method employed in a second embodiment of the invention.

Now, in FIG. 6, there is shown an explanatory view of a second embodiment according to the present invention. In the second embodiment, the same or similar parts as in the before-mentioned first embodiment shown in FIG. 1 are given the same designations, and the description thereof is omitted here.

Referring back again to the rolling treatment employed in the first embodiment according to the invention, when the spliced metal webs 10, 22 are different in thickness from each other, the pressures that are applied from the rolling roller onto the different-thickness webs are different, with the result that the welded bead adjacent to the welded edges of the smaller-thickness metal web is not always rolled. Because of this, the strength of the welded portion in the smaller-thickness metal web can be increased by the above-mentioned rolling treatment, which makes it easier for the welded portion 40 to be broken or cut.

Now, in the second embodiment, while the following end 10A of the thin metal web 10 is being held by the clamp 26 and the leading end 22A of the thick metal web 22 is being held by the clamp 28, the thin metal web 10 and the thick metal web 22 are butted against each other. Specifically, a method of splicing thin and thick metal webs to each other includes two main cases. That is, in one of them, the two metal webs 10, 22 are welded together while they are being butted against each other. In the other, the metal webs 10, 22 are welded while they are lapped on each other by 2 mm or so, preferably, on the order of 0.5 mm ~ 1 mm. Especially when the two metal webs 10, 22 have a thickness of 0.3 mm or less, they are lapped in part on each other before they are welded together, thereby preventing formation of blowholes, or melting down.

Figure 7:
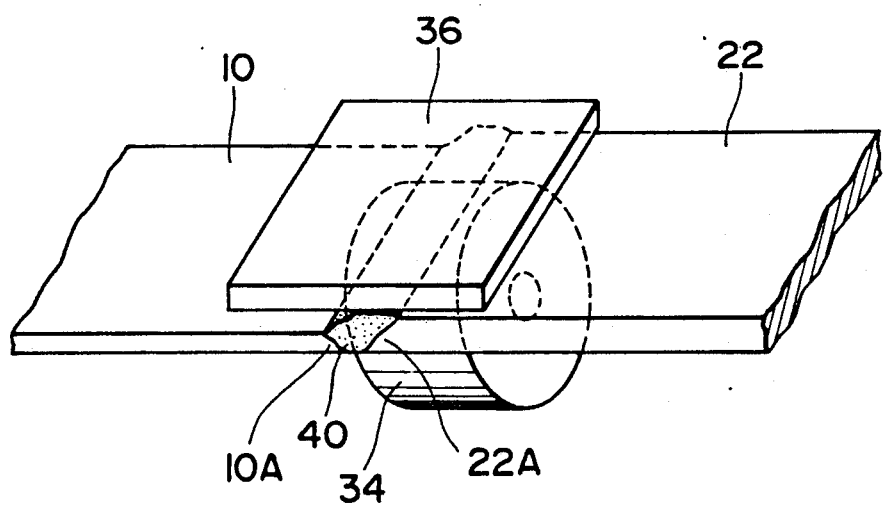
FIG. 7 is a perspective view to illustrate the rolling method in the second embodiment of the invention; and, FIGS. 8(a) and (b) are perspective views of the welded portions obtained by a conventional metal web splicing method.

Also, the welding is performed from above the butted portions thereof and, as shown in FIG. 7, on the upper surfaces of the metal webs 10, 22 there is formed a welded bead portion 40.

In welding, the TIG arc welding and MIG arc welding as well as gas welding, laser welding and the like can be used selectively according to the kinds of the metals used.

Downstream of the welding device there is arranged the rolling device 32 provided with the rolling roller 34. The rolling roller 34 is disposed in the rear of the welded bead attached portion 40 extending between the metal webs ends 10A and 22A and the roller 34 rolls the welded bead attached portion 40 from behind it.

In accordance with the metal web splicing method constructed in the above-mentioned manner according to the invention, the two metal webs 10, 22 are welded together by the welding device 24 after they are butted against each other, and the resultant weld bead attached portion 40 thereof is rolled from behind it by the rolling roller 34 of the rolling device 32. As a result of this, the entire weld bead attached portion 40 can be surely pressed from behind it to thereby increase the splicing strength thereof. Therefore, the welding spliced metal webs 10, 22 can be brought into smooth sliding contact with the pass roller and also can be moved to a coating device (not shown) which is provided downstream of the pass roller.

Next, description will be given below of tests on the strength of the welded portion of the metal webs spliced in accordance with the metal web splicing method according to the invention.

In the tests, an aluminum web having a thickness of 0.15 mm and a width of 300 mm is employed as the thin metal web 10, and an aluminum web having a thickness of 0.4 mm and a width of 300 mm is employed as the thick metal web 22. While these two metal webs 10, 22 are lapped by 1.5 mm on each other, they are welded together by the TIG arc welding at the speed of 1 m/min., and the weld bead attached portion 40 thereof is then rolled from behind it. On the other hand, in the case of a comparison sample, the upper surface of the weld bead attached portion 40 thereof is rolled directly by the rolling roller 34.

While loading a tension force of 60 kg on the test and comparison samples, they were made to pass round between 10 rubber rollers each having a diameter of 100 mm and 10 rubber rollers each having a diameter of 150 mm and checked the number of rounds where they were cut respectively, that is, a pass roller passage test was made.

As a result of the passage test, while the conventional comparison sample was cut at the fifth round, the test sample according to the present invention was cut at the 20th round. Therefore, the test shows that the welded portion of the metal webs can be increased in strength if it is rolled from behind the weld bead attached portion.

As has been described hereinbefore, according to the present metal web splicing method, since rolling is performed from behind the weld bead attached portion of the spliced metal webs, the weld bead can be pressed from behind with a uniform pressure, that is, the strength of the welded portion can be increased due to the rolling thereof.

It should be understood, however, that there is no intention to limit the invention to the specific forms disclosed but on the contrary, the invention is to cover all modifications, alternate constructions and equivalents falling within the spirit and scope of the invention as expressed in the appended claims.

What is claimed is:

1. A method of splicing together metal webs of different widths, comprising the steps of:
   positioning together the end portions of said metal webs in a butted or lapped manner, one of said webs being wider than another of said webs;
   welding the butted or lapped portions of said webs to form a welded portion and leaving a portion of said wider web unwelded;
   after said welding step, trimming the unwelded portion at the end of said one wider web in a tapered manner toward said welded portion; and
   rolling said welded portion by moving a roller in the width direction of said metal webs.

2. A method as set forth in claim 1, wherein said welded positioned portion is rolled and the edges on the two sides of said welded positioned portion are trimmed.

3. A method as set forth in claim 1, wherein the ends of said metal webs are pre-cut before they are spliced together.

4. A method as set forth in claim 1, wherein said welding comprises one of a TIG arc welding, an MIG arc welding, a gas welding, and a laser welding.

5. A method as set forth in claim 2, wherein said trimming treatment is carried out by one of laser cutting, and air plasma cutting.

* * * * *